United States Patent
Ogawa

(10) Patent No.: US 7,173,351 B2
(45) Date of Patent: Feb. 6, 2007

(54) MOTOR AND METHOD OF MANUFACTURING THE SAME

(75) Inventor: Yoshinori Ogawa, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 607 days.

(21) Appl. No.: 10/396,689

(22) Filed: Mar. 26, 2003

(65) Prior Publication Data
US 2006/0103243 A1 May 18, 2006

(30) Foreign Application Priority Data
Mar. 26, 2002 (JP) ............................. 2002-085425

(51) Int. Cl.
H02K 5/00 (2006.01)
(52) U.S. Cl. ...................... 310/49 R; 310/89
(58) Field of Classification Search ............. 310/49 R, 310/89, 194, 254, 261, 263
See application file for complete search history.

(56) References Cited

U.S. PATENT DOCUMENTS 6,713,936 B2 * 3/2004 Lee ............................ 310/257

* cited by examiner

*Primary Examiner*—Thanh Lam
(74) *Attorney, Agent, or Firm*—Sughrue Mion, PLLC

(57) ABSTRACT

A motor in which drive coils are arranged in an axial direction of a cylindrical rotor magnet of which an outer peripheral surface is magnetized, the drive coils are cylindrical bodies having respectively center holes into which a rotor shaft is to be inserted, curling cases each of which is formed by bending a flat plate made of a magnetic material into a tubular shape, surround the drive coils, respectively, and surround a cylindrical surface of the rotor magnet with a predetermined gap therebetween, and portions of the surfaces of the curling cases, which face the drive coils associated therewith, serve as yoke parts, respectively, while other portions of the curling cases, which face the rotor magnet, are formed to be pole teeth, and also serve as yoke plates.

7 Claims, 6 Drawing Sheets

MOTOR AND METHOD OF MANUFACTURING THE SAME

The present application is based on Japanese Patent Application No. 2002-85425, the entire contents of which are incorporated herein by reference.

BACKGROUND OF THE INVENTION

1. Field of the Invention

The present invention relates to a motor which is small in diameter, but is capable of producing a relatively large torque and in which drive coils are arranged in the axial direction of a rotor magnet, and a method of manufacturing the motor.

2. Related Art

A motor in which a plurality of drive coils are arranged in the axial direction of the rotor magnet is proposed as a example of the motor which is small in diameter, but is capable of producing a relatively large torque is a motor.

In the light of the motor structure, a traditional motor may be categorized into an inner rotor type motor and an outer rotor type motor. The former motor has a structure that a rotor magnet is rotatably disposed within an inner periphery of a stator coil, and the latter motor has a structure that a rotor magnet is rotatably disposed outside an outer periphery of the stator coil. Since the traditional motors are inevitably large in outside diameter, those motors are not suitable for a use desirably needing the motor of a small diameter. To cope with this, there is a proposal in which a plurality of drive coils are arranged in the axial direction of the rotor magnet. In such a motor, the stator is axially aligned with the rotor. Therefore, the outside diameter of the motor may be reduced and if it is reduced, a relatively large torque can be produced.

SUMMARY OF THE INVENTION

FIG. 7 shows a motor of the type in which a plurality of drive coils are arranged in the axial direction of the rotor magnet. This motor was internally developed previously but is not publicly disclosed. This motor is a stepping motor. In FIG. 7, reference numeral 45 designates a rotor shaft. A rotor magnet 46 is mounted to a mid position of the rotor shaft 45 as viewed in the length direction. The rotor magnet 46 is magnetized at fixed intervals in the circumferential direction to have S- and N-poles alternately appearing in the same direction. The rotor shaft 45 and the rotor magnet 46 form a rotor.

A couple of stators, which include drive coils 50 and 55 wound on bobbins, are located on both sides of the rotor magnet 46 as viewed in the axial direction. One of the stators includes a pair of core plates 47 and 51, and the drive coil 50. One core plate 47 includes a flat surface facing an outer end face of the drive coil 50 and a cylindrical surface facing an outer peripheral surface of the drive coil 50. The cylindrical surface of the core plate extends to a mid position of the rotor magnet 46 as viewed in the axial direction, and is confronted with an outer peripheral surface of the rotor magnet 46 with a slight gap therebetween. The upper end of the cylindrical surface the core plate as viewed in the axial direction is cut out at predetermined intervals in the circumferential direction to form pole teeth 48. The other core plate 51 includes a cylindrical surface facing an inner peripheral surface of the drive coil 50, a flat surface facing an inner end face of the drive coil 50, which is continuous to the cylindrical surface, and pole teeth 52 which are formed by cutting out the upper end of the cylindrical surface of the core plate as viewed in the axial direction at predetermined intervals in the circumferential direction. The cylindrical surface of the core plate 51 extends to a mid position of the rotor magnet 46 as viewed in the axial direction and is confronted with an outer peripheral surface of the rotor magnet 46 with a slight gap therebetween. The pole teeth 48 of the core plate 47 and the pole teeth 52 of the core plate 51 are alternately arranged in the circumferential direction forming a gap.

The other stator of those stators includes a pair of core plates 53 and 56 and the drive coil 55. One core plate 53 includes a flat surface facing an outer end face of the drive coil 55 and a cylindrical surface facing an outer peripheral surface of the drive coil 55. The cylindrical surface of the core plate extends to a mid position of the rotor magnet 46 as viewed in the axial direction, and is confronted with an outer peripheral surface of the rotor magnet 46 with a slight gap therebetween. The upper end of the cylindrical surface the core plate as viewed in the axial direction is cut out at predetermined intervals in the circumferential direction to form pole teeth 54. The other core plate 56 includes a cylindrical surface facing an inner peripheral surface of the drive coil 55, a flat surface facing an inner end face of the drive coil 55, which is continuous to the cylindrical surface, and pole teeth 57 which are formed by cutting out the upper end of the cylindrical surface of the core plate as viewed in the axial direction at predetermined intervals in the circumferential direction. The cylindrical surface of the core plate 56 extends to a mid position of the rotor magnet 46 as viewed in the axial direction and is confronted with an outer peripheral surface of the rotor magnet 46 with a slight gap therebetween. The pole teeth 53 of the core plate 56 and the pole teeth 57 of the core plate 56 are alternately arranged in the circumferential direction forming a gap. The drive coil 50 is disposed within a space defined by the core plates 47 and 51, through the bobbin associated therewith. The drive coil 55 is disposed within a space defined by the core plates 53 and 56, through the bobbin associated therewith. The drive coils 50 and 55 are each cylindrically wound about the rotor shaft 45.

End plates 41 and 42 are fixed to the end faces of the stators, respectively. Small-diameter parts of bearings 43 an 44 each made of a magnetic material are respectively fit into center holes of the end plates 41 and 42, whereby the bearings 43 and 44 are fixed to the end plates 41 and 42. The rotor shaft 45 is passed through the center holes of the core plates 51 and 56, while being spaced from each other by a predetermined gap. The same is also passed through the center holes of the bearings 43 and 44, and rotatably supported by those bearings 43 and 44.

By switching the current feeding to the drive coils 50 and 55, the polarities of the projections of the pole teeth 48, 52, 54 and 57 are switched, so that by magnetic attraction and repelling forces interactively acting between those magnetic poles of the pole teeth and the magnetic poles of the rotor magnet 46, the rotor magnet 46 is energized in the circumferential direction and the rotor is driven to rotate.

In the structure of the motor mentioned above, an outside diameter of the rotor magnet 46 may be selected to be large relative to that of the whole motor. In this respect, the motor is advantageous when the motor is reduced in size while securing a given torque generated.

In the motor thus constructed, the yoke plates are complicated in configuration. The result is that part formation and assembling are troublesome. Particularly, the yoke plates are formed by pressing and hence, it is difficult to stably and accurately configure the yoke plate since its configuration is complicated.

In the motor thus structured, a magnetic flux concentrates on the core part near the shaft. Therefore, thickening of this portion relative to the remaining part will contribute to improvement of a motor efficiency. When a normal pressing process is used, the core part near the shaft is bent by pressing. Accordingly, this core part is likely to be thin. The fact that the output torque of the conventional motor is small results from the thinning of that core part.

Accordingly, an object of the present invention is to provide a motor and a method of manufacturing the same in which the process of forming the core plate is enabled to be simplified, and particularly in which use of the curling process is enough for forming the core plate, and the need of using the bending process for manufacture of the core plate is eliminated, no chance of the thinning of the core plate is present, and a larger output torque is produced.

According to the invention, there is provided a motor in which drive coils are arranged in an axial direction of a cylindrical rotor magnet of which an outer peripheral surface is magnetized, wherein the drive coils are cylindrical bodies having respectively center holes into which a rotor shaft is to be inserted, curling cases each of which is formed by bending a flat plate made of a magnetic material into a tubular shape, surround the drive coils, respectively, and surround a cylindrical surface of the rotor magnet with a predetermined gap therebetween, and portions of the surfaces of the curling cases, which face the drive coils associated therewith, serve as yoke parts, respectively, while other portions of the curling cases, which face the rotor magnet, are formed to be pole teeth, and also serve as yoke plates.

In the above construction, the drive coils may be located on both sides of the rotor magnet as viewed in the axial direction.

The drive coils may be wound on bobbins, and bearings for supporting the rotor shaft are fit into the bobbins.

The motor may include another yoke plate having pole teeth which is separately formed from to the curling case serving also as the yoke plate, and the pole teeth of the curling case and the pole teeth of the yoke plate are alternately arranged in the circumferential direction.

According to another aspect of the invention, there is provided a method of manufacturing a motor in which drive coils are arranged in an axial direction of a cylindrical rotor magnet of which an outer peripheral surface is magnetized, wherein a couple of yokes having pole teeth are provided, which are arranged alternately in the circumferential direction, one of the yokes is a curling case which has a yoke part and pole teeth, whereby the curling case serves also as a yoke plate, the curling case surrounds the drive coil and surrounds a cylindrical surface of the rotor magnet with a predetermined gap therebetween, and after fixing another yoke plate which is different from the curling case and has pole teeth, the pole teeth of the curling case are adjustingly positioned with respect to the pole teeth of the another yoke plate, and fixed.

DETAILED DESCRIPTION OF THE PREFERRED EMBODIMENTS

Figure 1:
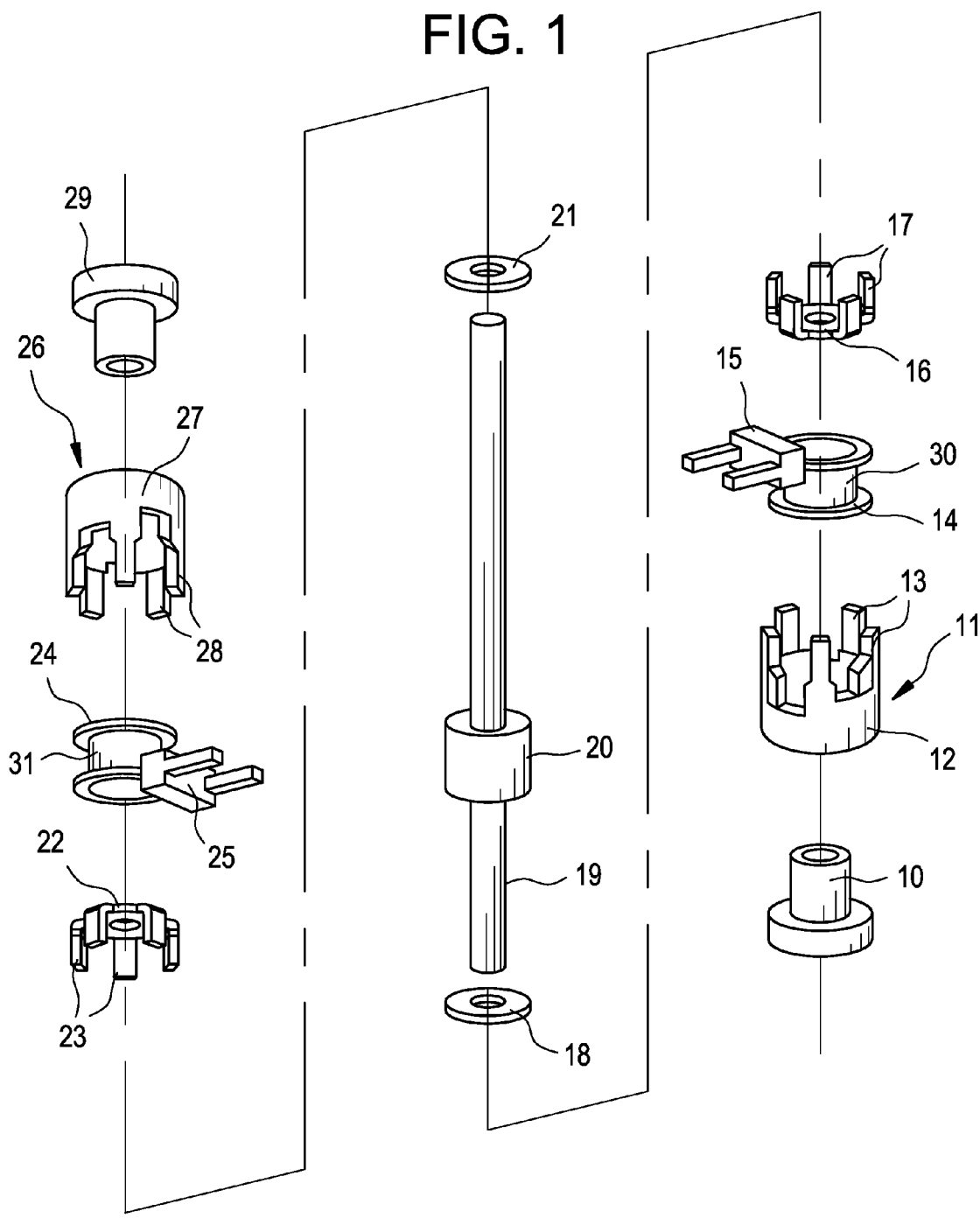
FIG. 1 is an exploded, perspective view showing a motor and a method of manufacturing the same which are embodiments of the invention.

A motor and a method of manufacturing the same which are constructed according to the present invention will be described in detail with reference to the accompanying drawings. An illustrated embodiment of the invention is a stepping motor.

In FIGS. 1 through 6, a rotor of the motor is generally made up of a rotor shaft 19 and a cylindrical rotor magnet 20 integrally mounted on an outer periphery of the rotor shaft 19. An outer peripheral surface of the cylindrical rotor magnet 20 is magnetized at predetermined intervals in the circumferential direction, so that N- and S-poles alternately appear in the outer peripheral surface in the circumferential direction.

A stator is located on one part of the rotor magnet 20 as viewed in the axial direction; the stator is made up of a bearing 10, a curling case 11, a bobbin 14, a drive coil 30, and a yoke plate 16. Another stator is mounted on the other part of the rotor magnet 20; the stator is made up of a yoke plate 22, a drive coil 31, a bobbin 24, a curling case 26, and a bearing 29.

The bearing 10 and the bearing 29 have respectively center holes into which the rotor shaft 19 is to be inserted. The rotor shaft 19 is supported by the peripheral walls of the center holes of the bearing 10 and the bearing 29, which are closer to the outer ends thereof. The bearings 10 and 29 are each so shaped that a part of the bearing, which is closer to one end thereof as viewed in the axial direction, has a large outside diameter, while the remaining part thereof has a small outside diameter. The drive coils 30 and 31, each cylindrically wound, are fit to the small-diameter parts of the bearings. The drive coils 30 and 31 are wound on the bobbins 14 and 24, respectively. The bobbins 14 and 24 are fit to the small-diameter parts of the bearings, respectively. As a result, the drive coils 30 and 31 are fit to the small-diameter parts of the bearings, respectively. In other words, the drive coils 30 and 31 each take the form of a cylindrical member having a center hole.

Figure 5:
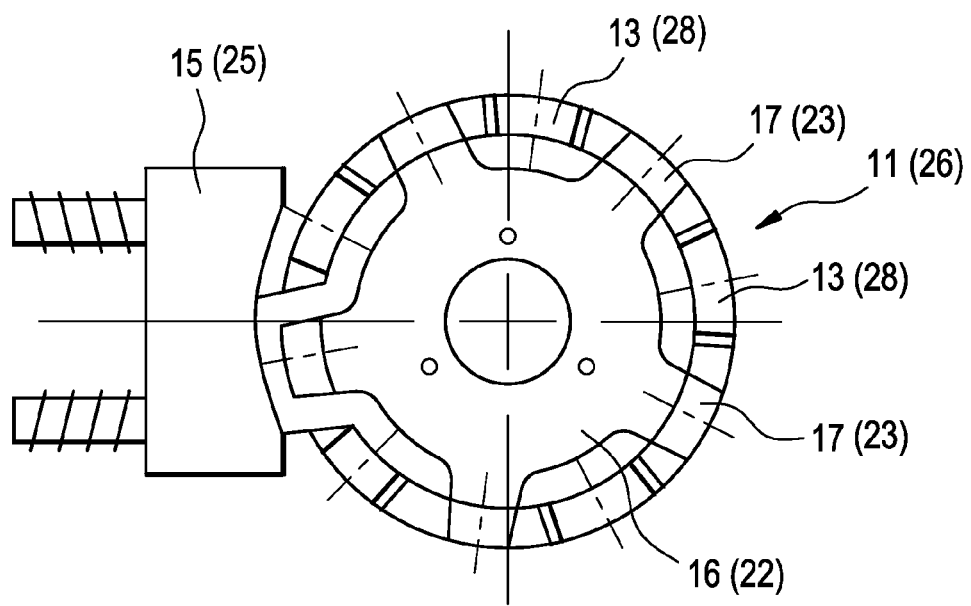
FIG. 5 is a side view showing a structure including a curling case and a core plate in the motor of the embodiment.
Figure 6:
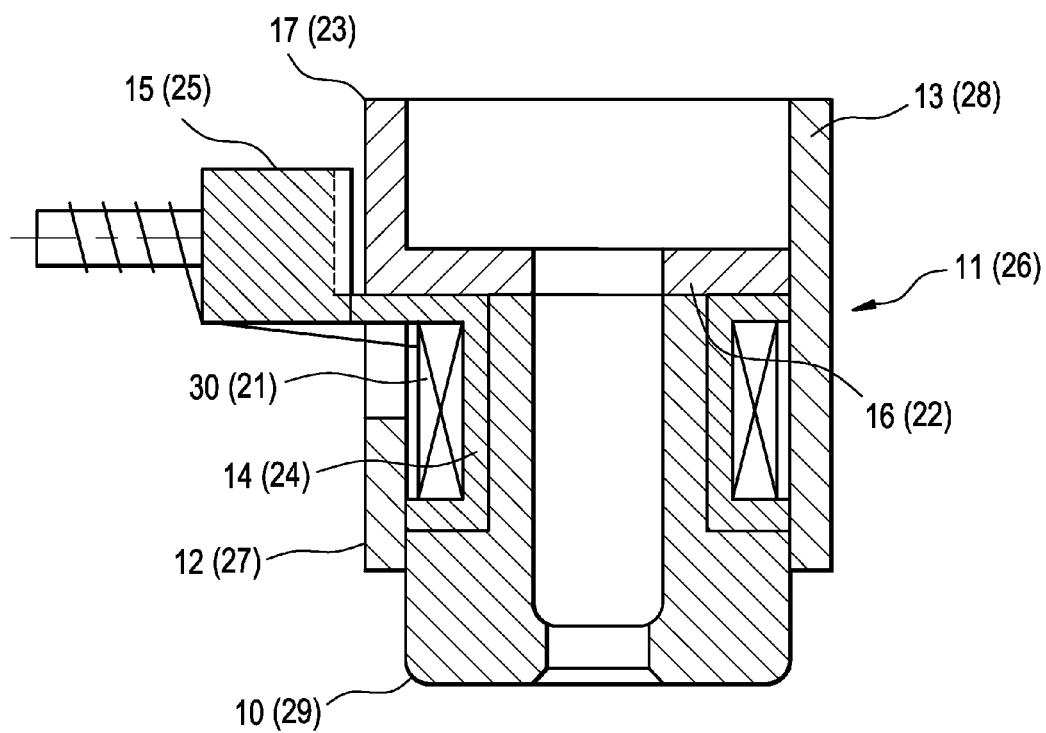
FIG. 6 is a longitudinal sectional view showing the structure including the curling case and the core plate in the motor of the embodiment.
Figure 7:
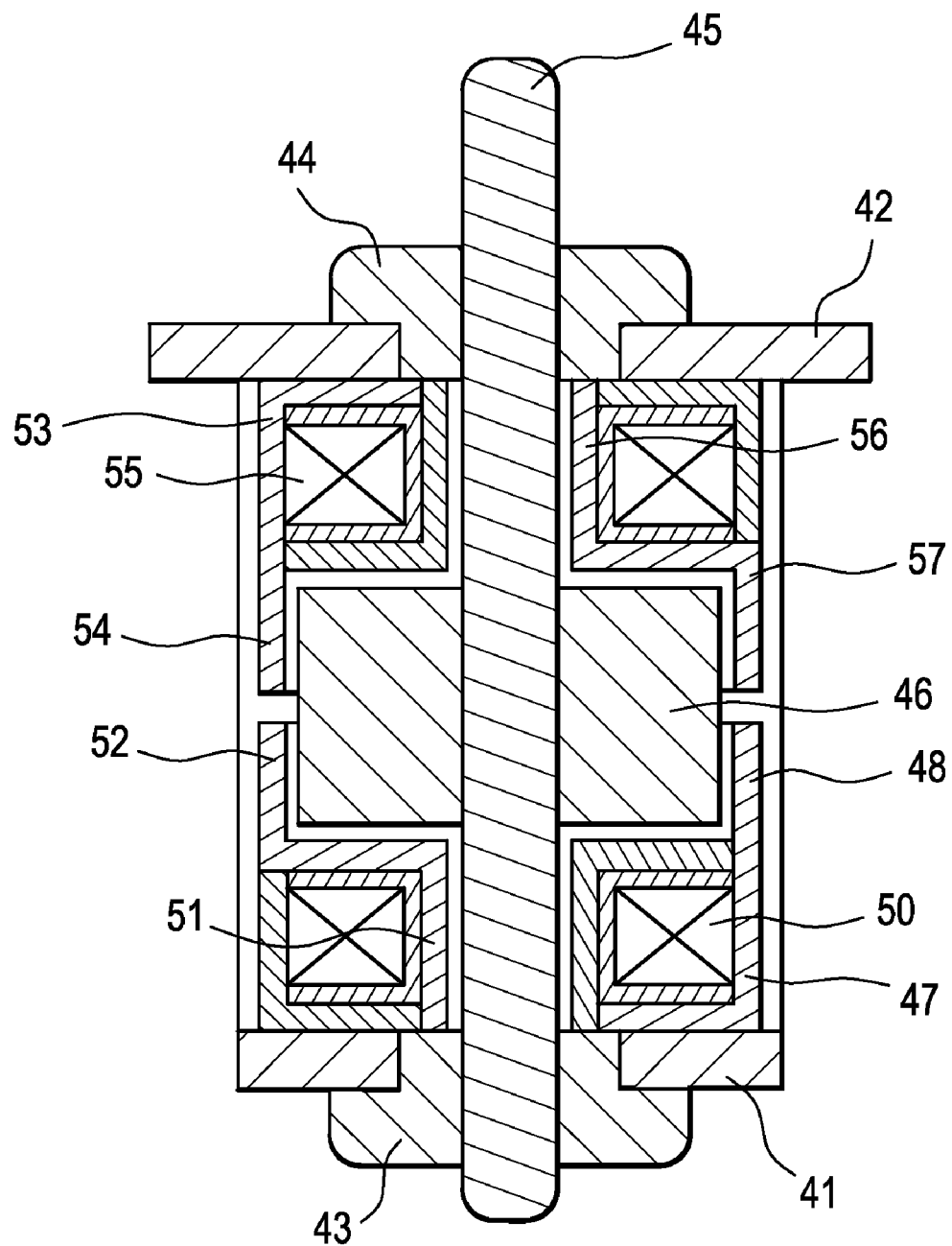
FIG. 7 is a longitudinal sectional view showing an example of a conventional stepping motor.

As shown in FIGS. 5 and 6, a curling case 11 having the inside diameter substantially equal to the outside diameter of the large-diameter part of the bearing 10, covers the outer peripheral surface of the drive coil 30 and a part of the large-diameter part of the bearing 10. A part of the curling case 11 and the large-diameter part of the bearing 10 are fastened by spot welding or another suitable joining means. Thus, the curling case 11 surrounds the drive coil 30, and almost the half of the cylindrical surface of the rotor magnet 20 with a predetermined gap therebetween. The curling case 11 is formed by bending a flat plate made of a magnetic material into a tubular shape, and serves also as a yoke plate. As shown in FIG. 1, a surface of the curling case 11 which is confronted with the drive coil 30 serves as a yoke part 12, and another part of the curling case which is confronted with the rotor magnet 20 is provided with pole teeth 13 which are uniformly arrayed at fixed pitches in the circumferential direction. The pole teeth 13 surround almost the half of the rotor magnet 20 in the axial direction. The curling case 11 is magnetized to have the same polarity as of one end (the lower end in FIG. 6) of the drive coil 30 in the axial direction.

In addition to the curling case 11, the yoke plate 16 is used in combination with the curling case 11. The yoke plate 16 contains a yoke part which is confronted with the other surface of the drive coil 30, and pole teeth 17 which extend from the yoke part and bent perpendicularly to the same, and are confronted with the cylindrical surface of the rotor magnet 20 with a predetermined gap therebetween. The pole teeth 17 surround almost the half of the rotor magnet 20 as viewed in the axial direction in cooperation with the pole teeth 13 of the curling case 11. The yoke plate 16 is magnetized to have the same polarity as of the other end (the upper end in FIG. 6) of the drive coil 30 in the axial direction. As seen from FIGS. 2 and 5, the pole teeth 13 of the curling case 11 and the pole teeth 17 of the yoke plate 16 are alternately arrayed in the circumferential direction with a predetermined gap therebetween. The yoke plate 16 is fastened to an end face of the bearing 10 by such joining means as spot welding. A positional relation of the pole teeth 13 to the curling case 11 to the pole teeth 17 of the yoke plate 16 is important from the viewpoint of the motor performance. Accordingly, the pole teeth 13 of the curling case 11 are adjustingly positioned with respect to the pole teeth 17 of the yoke plate 16.

The bobbin 14 includes a cylindrical part on which the drive coil 30 is wound, and collars integrally formed at both ends of the cylindrical part. That is, the bobbin is formed by shaping a member, which is shaped like U in the longitudinal section, into a ring-like form. The bobbin 14 may be formed by, for example, integral molding using resin. A terminal part 15 is protruded from an outer periphery of one of the collars, while being integral with the same. A pair of horn-like projections to which a terminal of the drive coil 30 is connected are protruded from the terminal part 15.

Another stator which is made up of the bearing 29, the curling case 26, the bobbin 24, the drive coil 31 and pole teeth is also constructed like the already-stated stator which is made up of the bearing 10, the curling case 11, the bobbin 14, the drive coil 30 and the yoke plate 16. Those stators are disposed symmetrically with respect to the rotor magnet 20.

In FIGS. 5 and 6, a curling case 26 having the inside diameter substantially equal to the outside diameter of the large-diameter portion of the bearing 29, covers the outer peripheral surface of the drive coil 31 and a part of the large-diameter part of the bearing 29. A part of the curling case 26 and the large-diameter part of the bearing 29 are fastened by spot welding or another suitable joining means. Thus, the curling case 26 surrounds the drive coil 31, and almost the half of the cylindrical surface of the rotor magnet 20 with by a predetermined gap therebetween. The curling case 26 is formed by bending a flat plate made of a magnetic material into a tubular shape, and serves also as a yoke plate. As shown in FIG. 1, a surface of the curling case 26 which is confronted with the drive coil 31 serves as a yoke part 27, and another part of the curling case which is confronted with the rotor magnet 20 are provided with pole teeth 28 which are uniformly arrayed at fixed pitches in the circumferential direction. The pole teeth 28 surround almost the half of the rotor magnet 20 in the axial direction with by a predetermined gap therebetween. The curling case 26 is magnetized to have the same polarity as of one end of the drive coil 31 in the axial direction.

In addition to the curling case 26, the yoke plate 22 is used in combination with the curling case 26. The yoke plate 22 contains a yoke part which is confronted with the other surface of the drive coil 31, and pole teeth 23 which extend from the yoke part and are bent perpendicularly to the same, so as to be confronted with the cylindrical surface of the rotor magnet 20 with a predetermined gap therebetween. The pole teeth 23 also surround almost the half of the rotor magnet 20 with an appropriate gap therebetween, in cooperation with the pole teeth 28 of the curling case 26. The yoke plate 22 is magnetized to have the same polarity as of the other end of the drive coil 31 in the axial direction. As seen from FIG. 2, the pole teeth 28 of the curling case 26 and the pole teeth 23 of the yoke plate 22 are alternately arrayed in the circumferential direction so as to form a gap. The yoke plate 22 is fastened to an end face of the bearing 29 by such joining means as spot welding. A position of the pole teeth 28 of the curling case 26 is adjusted with respect to the pole teeth 23 of the yoke plate 22, and the curling case 26 is fixed, whereby the pole teeth 28 of the curling case 26 and the pole teeth 23 of the yoke plate 22 are relatively adjusted. In this way, dimensional adjustment of the motor in the axial direction may be carried out on the curling case 26 side.

The bobbin 24 includes a cylindrical part on which the drive coil 31 is wound, and collars integrally formed at both ends of the cylindrical part. That is, the bobbin is a member, which is shaped like U in the longitudinal section, is shaped into a ring-like form. The bobbin 24 may be formed by, for example, integral molding using resin. A terminal part 25 is protruded from an outer periphery of one of the collars, while being integral with the same. A pair of horn-like projections to which a terminal of the drive coil 31 is connected are protruded from the terminal part 25.

Figure 2:
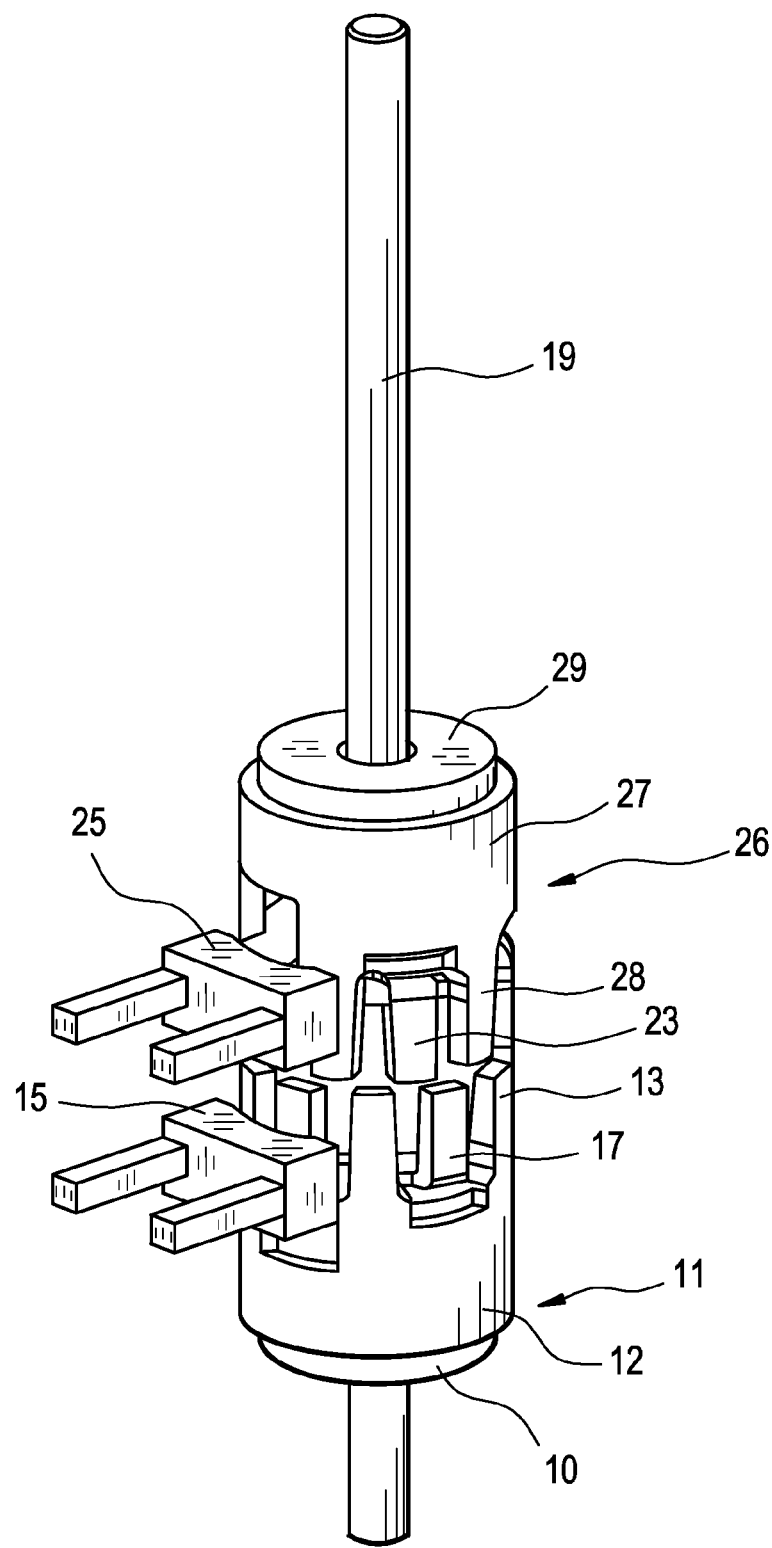
FIG. 2 is a perspective view showing an outward appearance of the motor of the embodiment.
Figure 3:
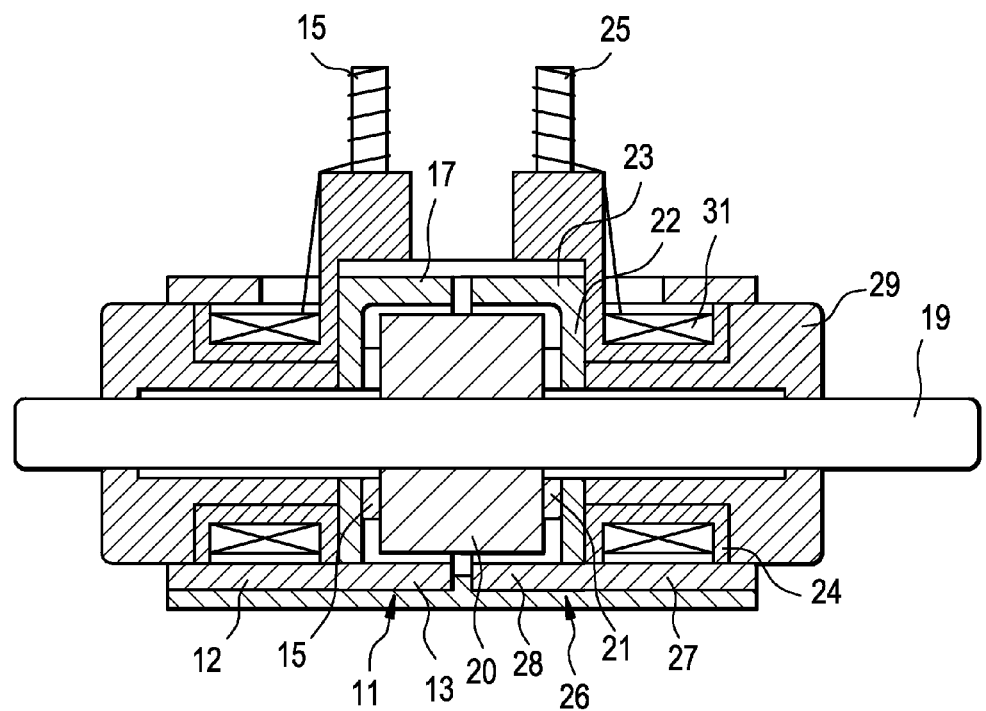
FIG. 3 is a longitudinal sectional view showing the motor of the embodiment.
Figure 4:
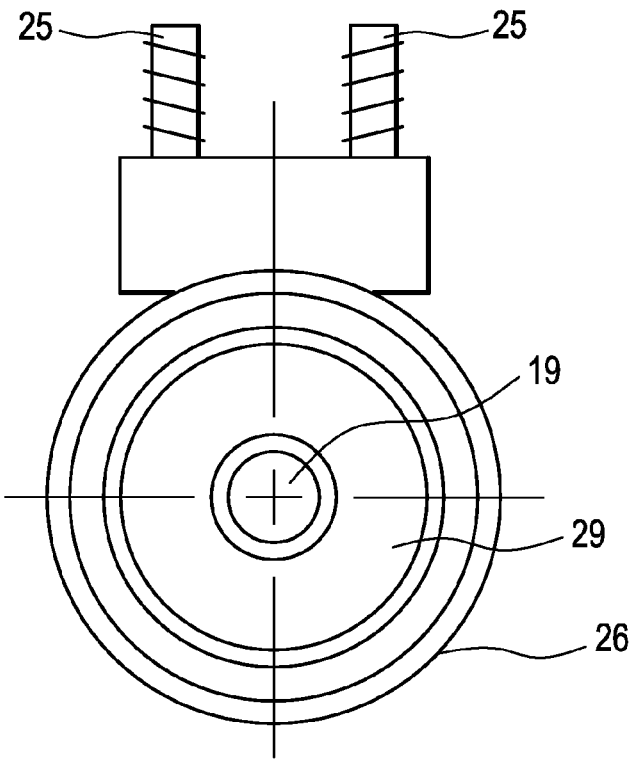
FIG. 4 is a right side view showing the motor of the embodiment.

FIG. 2 is a perspective view showing an outward appearance of the motor thus constructed. As seen FIG. 2, the tips of the pole teeth 13 and 17 are axially opposed to the tips of the pole teeth 23 and 28 in a state that a predetermined gap is present between the former tip array and the later tip array. The terminal parts 15 and 25 axially face each other, and the terminals of the drive coils 30 and 31 are wound around the horn-like projections. Those projections of the terminal parts may be used as terminals for the connection to an external circuit, or terminals to which the terminals of the drive coils 30 and 31 are temporarily connected.

As shown in FIG. 1, slip rings 18 and 21 are applied to the parts of the rotor shaft 19 which are located on both sides of the rotor magnet 20. The slip ring 18 is interposed between one end face of the rotor magnet 20 and an end face of the bearing 10, while the slip ring 21 is interposed between the other end face of the rotor magnet 20 and an end face of the bearing 29.

The two stators which are located on both sides of the rotor magnet 20 as viewed in the axial direction are coupled together while being axially spaced from each other a predetermined distance, by welding or fitting a cylindrical non-magnetic member to the outer peripheries of the curling cases 11 and 26 or welding a non-magnetic coupling member having a partial cylindrical surface or other suitable fastening means.

Operation of the stepping motor thus constructed will be described. Current is fed alternately to the drive coils 30 and 31, which are located on both sides of the rotor magnet 20 as viewed in the axial direction of the rotor magnet or the direction of the current fed to them is alternately changed.

Then, the pole teeth 13, 23, 17 and 28 are alternately magnetized to have S and N poles and a rotating magnetic field is generated. By the rotating magnetic field, the rotor magnet 20 is energized for rotation, and the rotor shaft 19, together with the rotor magnet 20, is rotated.

The embodiment uses the curling cases 11 and 26, which are each formed by bending a flat plate made of a magnetic material into a tubular shape, and those curling cases are used as the yoke plates. Therefore, the need of the process of bending the core plate is eliminated, resulting in simplification of the manufacturing process.

Incidentally, in the illustrated embodiment, the core plate not requiring the bending process is one of the core plates forming the stator, and the other core plate is formed not using the bending process. The above-mentioned advantages resulting from no necessity of using the bending process can be produced although the core plate not requiring the bending process for its manufacture is one in number. The other core plate is formed by the bending process, indeed; however, its configuration is simpler than of the core plate of the conventional motor. Accordingly, process simplification is possible. Further, a chance of the core plate thinning is lessened as possible, and a chance of the torque reduction is minimized. Since the core plate bending process is not needed, the problem that the core plate is thinned by the bending process does not arise. As a result, a larger output torque can be obtained. Since the core plate is formed by using the curling technique, a core plate with a stable configuration can be produced.

As seen from the foregoing description, the invention uses the curling cases, which are each formed by bending a flat plate made of a magnetic material into a tubular shape. Therefore, the need of the process of bending the core plate is eliminated, and the manufacturing process is simplified. Further, as the result of no necessity of using the bending process, a chance of the core plate thinning by the bending process is not present, and a larger output torque can be produced. By forming the core plate by using the curling technique, a core plate with a stable configuration can be produced.

What is claimed is:

1. A motor comprising:
    a rotor shaft;
    a cylindrical rotor magnet having a magnetized outer peripheral surface;
    drive coils of cylindrical bodies having respectively center holes into which said rotor shaft is to be inserted, said drive coils being arranged in an axial direction of the cylindrical rotor magnet;
    a curling case formed in a tubular shape by bending a flat plate made of a magnetic material, wherein both ends of said curling case have a same sized diameter opening, said curling case surrounding one of said drive coils and a cylindrical surface of said rotor magnet with a predetermined gap therebetween,
    wherein a first part of said curling case facing said one of said drive coils serves as a yoke part, and
    a second part of said curling case facing said rotor magnet is provided with pole teeth; and
    a yoke plate consisting of a yoke part and pole teeth bending from the yoke part, wherein said yoke part confronts an end face of said one of said drive coils that faces said rotor magnet, and wherein said pole teeth, which are formed separately from said curling case, face the cylindrical surface of the rotor magnet, and wherein said pole teeth of said curling case and said pole teeth of said yoke plate are alternately arranged in the circumferential direction.

2. A motor according to claim 1, wherein said drive coils are located on both sides of said rotor magnet in the axial direction.

3. A motor according to claim 1, wherein said drive coils are wound on bobbins, and bearings for supporting said rotor shaft are fitted into said bobbins.

4. A motor according to claim 1, wherein said first and second parts of said curling case are provided integrally.

5. A motor according to claim 1, the motor further comprising a bearing that includes:
    a center hole into which said rotor shaft is to be inserted;
    a large-diameter part at one end of the bearing in an axial direction; and
    a small-diameter part, to which the drive coils are fit, in a remaining part of the bearing.

6. A motor according to claim 5, wherein said one of said drive coils is wound on a bobbin, and said bearing for supporting said rotor shaft is fitted into said bobbin, and wherein the large-diameter part of the bearing has substantially the same diameter as that of a collar portion of the bobbin and abuts one of the opening portions of the curling case, and wherein the small-diameter part of the bearing has substantially the same length as that of the axial length of the bobbin and a tip of the small-diameter part of the bearing abuts the yoke part of the yoke plate.

7. A motor according to claim 1, further comprising a bearing for supporting said rotor shaft, wherein said bearing has a large-diameter part and a small-diameter part, and wherein the curling case completely covers an outer peripheral surface of said one of said drive coils and covers a part of an outer peripheral surface of the large-diameter part of the bearing.

* * * * *